United States Patent
Pacchetti et al.

(10) Patent No.: US 10,797,852 B2
(45) Date of Patent: Oct. 6, 2020

(54) FRAME SYNCHRONIZATION

(71) Applicant: Telefonaktiebolaget LM Ericsson (publ), Stockholm (SE)

(72) Inventors: Roberto Pacchetti, Genoa (IT); Davide Sanguinetti, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/605,524

(22) PCT Filed: Apr. 28, 2017

(86) PCT No.: PCT/EP2017/060243
§ 371 (c)(1),
(2) Date: Oct. 16, 2019

(87) PCT Pub. No.: WO2018/197011
PCT Pub. Date: Nov. 1, 2018

(65) Prior Publication Data
US 2020/0127806 A1    Apr. 23, 2020

(51) Int. Cl.
*H04B 10/00* (2013.01)
*H04L 7/00* (2006.01)
(Continued)

(52) U.S. Cl.
CPC ............ *H04L 7/0075* (2013.01); *H04J 14/02* (2013.01); *H04L 1/0057* (2013.01); *H04L 7/048* (2013.01)

(58) Field of Classification Search
USPC ................................................. 398/202–214
See application file for complete search history.

(56) References Cited

U.S. PATENT DOCUMENTS

| 5,596,608 A * | 1/1997 | Sassa | H04L 27/3872 |
| | | | 375/346 |
| 8,276,035 B1 * | 9/2012 | Savarese | H04L 1/0007 |
| | | | 714/749 |

(Continued)

FOREIGN PATENT DOCUMENTS

WO    2016138950 A1    9/2016

OTHER PUBLICATIONS

Huawei Technologies Co. et al., "Proposed Addition to the Draft of G.sup56 for CPRI over OTN Phase II", Proposal, Vancouver, CA, Feb. 20, 2017, pp. 1-17.

(Continued)

*Primary Examiner* — Agustin Bello
(74) *Attorney, Agent, or Firm* — Coats & Bennett, PLLC

(57) ABSTRACT

A method of frame synchronization comprises receiving a stream of bits, the stream comprising a sequence of frames, wherein each frame comprises a frame counter value representing the number of the frame in the sequence, and frame check bits for checking the validity of the frame counter value. The method comprises decoding a first section of bits, and trailing a first portion of the first section of bits as a trial counter value, and a second portion of the first section of bits as trial check bits. The method comprises checking if the trial counter value corresponds to a valid frame counter value using the trial check bits, and synchronizing based on whether the trial counter value is determined to correspond to a valid frame counter value.

20 Claims, 7 Drawing Sheets

(51) Int. Cl.
  *H04J 14/02* (2006.01)
  *H04L 1/00* (2006.01)
  *H04L 7/04* (2006.01)

(56) References Cited

U.S. PATENT DOCUMENTS

| | | | | |
|---|---|---|---|---|
| 9,451,569 | B1* | 9/2016 | Xiao | H04W 56/001 |
| 2002/0146983 | A1* | 10/2002 | Scherzer | H04W 16/28 |
| | | | | 455/67.11 |
| 2003/0037297 | A1* | 2/2003 | Araki | H04J 3/0608 |
| | | | | 714/746 |
| 2003/0119550 | A1* | 6/2003 | Rinne | H04W 36/30 |
| | | | | 455/553.1 |
| 2004/0018842 | A1* | 1/2004 | Yu | H04B 1/70755 |
| | | | | 455/437 |
| 2004/0081079 | A1* | 4/2004 | Forest | H04J 3/0652 |
| | | | | 370/216 |
| 2004/0242242 | A1* | 12/2004 | Wu | H04M 1/6066 |
| | | | | 455/456.5 |
| 2005/0198528 | A1* | 9/2005 | Unger | H04L 9/0891 |
| | | | | 726/22 |
| 2008/0298800 | A1* | 12/2008 | Naito | H04L 45/28 |
| | | | | 398/16 |
| 2008/0310734 | A1* | 12/2008 | Ahammad | G06K 9/00711 |
| | | | | 382/209 |
| 2009/0136057 | A1* | 5/2009 | Taenzer | H04R 3/005 |
| | | | | 381/74 |
| 2009/0318179 | A1* | 12/2009 | Satou | H04W 52/40 |
| | | | | 455/522 |
| 2011/0078545 | A1 | 3/2011 | He et al. | |
| 2011/0082877 | A1* | 4/2011 | Gupta | G10L 25/00 |
| | | | | 707/769 |
| 2014/0071997 | A1* | 3/2014 | Oksman | H04L 27/2613 |
| | | | | 370/474 |
| 2015/0169407 | A1* | 6/2015 | Hazel | G06F 11/1004 |
| | | | | 714/764 |
| 2016/0380354 | A1* | 12/2016 | Bozier | H04W 4/50 |
| | | | | 455/562.1 |
| 2020/0127806 | A1* | 4/2020 | Pacchetti | H04L 7/0075 |

OTHER PUBLICATIONS

Huawei Technologies, "Next Steps in OTN Development—Application Specific OTN and NFV", Discussion, Vancouver, CA, Feb. 20, 2017, pp. 1-6, WD11-19.

International Telecommunication Union, "Series G: Transmission Systems and Media, Digital Systems and Networks: OTN Transport of CPRI Signals", ITU-T G-Series Recommendations, Series G Supplement 56, Jul. 1, 2015, pp. 1-20, ITU.

International Telecommunication Union, "Series G: Transmission Systems and Media, Digital Systems and Networks: Digital Terminal Equipments—General; Series Y: Global Information Infrastructure, Internet Protocol Aspects and Next-Generation Networks, Internet of Things and Smart Cities: Internet Protocol Aspects—Transport; Interfaces for the Optical Transport Network", ITU-T Recommendation, G.709/Y.1331, Jun. 1, 2016, pp. 1-244, ITU.

Ericsson AB, et al., "Common Public Radio Interface (CPRI); Interface Specification", Interface Specification, CPRI Specification V7.0, Oct. 9, 2015, pp. 1-128.

* cited by examiner

FRAME SYNCHRONIZATION

TECHNICAL FIELD

The embodiments herein relate to a method and apparatus for frame synchronization and in particular, to the provision of fast-locking and low-latency framing and synchronization.

BACKGROUND

The use of Dense Wavelength Division Multiplexing (DWDM) for optical transport over the Common Public Radio Interface (CPRI) clients allows for a reduction of the number of optical fibers needed to interconnect network nodes of a communication network. An example of an optical transport is provided by the Optical Transport Network, OTN, standard. It provides Quality of Service (QoS), forward error correction (FEC), multiple levels of tandom connection monitoring (TCM), and transparent multiplexing of different client signals, including Ethernet and Synchronous Digital Hierarchy (SDH). The mapping of CPRI clients over the OTN was included in Supplement 56 to the International Telecommunication Union Telecommunication Standardization Sector's (ITU-T) G-series Recommendations.

There are stringent frequency and clock tolerance requirements specified for CPRI clients. However, the current OTN solution does not guarantee this required performance. The responsibility of determining whether or not the required performance is met is instead placed with the network operator. Any noise generated by the OTN would have to be handled by the CPRI system in order to meet the application requirements.

Synchronous mapping is enabled by a particular OTN signal, OTU2r, for some clients, but there are limitations for high client bitrates.

The current solution of mapping CPRI clients over OTN has a frame period of about 10.330 μs (OTU2r) and leads to high latency, especially when the FEC is enabled. The FEC block duration is one quarter of the frame period, about 2.58 μs. Usually the latency introduced by the FEC decoding is at least twice the block duration, so more than 5 μs for one direction.

SUMMARY

According to one aspect, there is provided a method of frame synchronization. The method comprises: a) receiving a stream of bits, the stream comprising a sequence of frames, wherein each frame comprises a frame counter value representing the number of the frame in the sequence, and frame check bits for checking the validity of the frame counter value. The method further comprises, b) decoding a first section of bits, and trailing a first portion of the first section of bits as a trial counter value, and a second portion of the first section of bits as trial check bits. The method comprises, c) checking if the trial counter value corresponds to a valid frame counter value using the trial check bits; and d) synchronizing based on whether the trial counter value is determined to correspond to a valid frame counter value.

In some embodiments, the trial counter value corresponds to a valid frame counter value if the trial counter value is correct or is correctable using the trial check bits.

In some embodiments, synchronizing based on whether the trial counter value corresponds to a valid frame counter value comprises determining a synchronization status, wherein the synchronization status is either: synchronized, unsynchronized or pre synchronized, wherein the pre synchronized status is a status which allows the synchronization status to be changed to synchronized.

In some embodiments, if the trial counter value does not correspond to a valid frame counter value and the synchronization status is currently unsynchronized the method comprises resetting the synchronization status to unsynchronized.

In some embodiments, if the synchronization status is set to unsynchronized, the method comprises decoding a second section of bits of the stream of bits, wherein the second section of bits is different from the first section of bits, and performing steps b), c) and d) for the second section of bits in place of the first section of bits.

In some embodiments, the second section of bits is shifted by a frame length plus one bit along the stream of bits with respect to the first section of bits.

In some embodiments, the method further comprises repeating steps b) c) and d) for different sections of bits, each shifted by a frame length plus one bit from the previous section of bits, until the trial counter value for a particular section of bits is found to correspond to a valid frame counter value.

In some embodiments the method further comprises: if the trial counter value corresponds to a valid frame counter value and the current synchronization status is unsynchronized, setting the synchronization status to pre synchronized and setting a previous counter value to the trial counter value.

In some embodiments, if the synchronization status is set to pre synchronized or synchronized, the method further comprises, reading a third section of bits shifted a frame length along the stream of bits with respect to the particular section bits for which the trial counter value was found to correspond to a valid frame counter value.

In some embodiments if the synchronization status is set to pre synchronized or synchronized, the method further comprises; performing steps b), c) for the third section of bits, and checking if the trial counter value for the third section is next in sequence to the previous counter value.

In some embodiments, if the synchronization status is set to pre synchronized or synchronized, the method further comprises: if the trial counter value does not correspond to a valid frame counter value or the trial counter value is not next in sequence to the previous counter value, and if a count of invalid frames is more than a first threshold number; setting the synchronization status to unsynchronized.

In some embodiments, if the synchronization status is set to synchronized, the method further comprises, if the trial counter value does not correspond to a valid frame counter value or the trial counter value is not next in sequence to the previous counter value, and if a count of invalid frames is not more than a first threshold number; increasing the count of invalid frames by one; and maintaining the synchronization status as synchronized.

In some embodiments, if the synchronization status is set to synchronized, the method further comprises: if the trial counter value does not correspond to a valid frame counter value or the trial counter value is not next in sequence to the previous counter value, and if a count of invalid frames is not more than a first threshold number; incrementing the previous counter value by one.

In some embodiments if the synchronization status is set to pre synchronized, the method further comprises: if the trial counter value corresponds to a valid frame counter value and the trial counter value is next in sequence to the previous counter value, and if a count of good frames is not more than a second threshold number, increasing the count of good frames by one; setting the previous count value as the trial count value; and maintaining the synchronization status as pre synchronized.

In some embodiments, if the synchronization status is set to pre synchronized or synchronized, the method further comprises: if the trial counter value corresponds to a valid frame counter value and the trial counter value is next in sequence to the previous counter value, and if a count of good frames is more than a second threshold number, setting the count of invalid frames to zero; setting the previous counter value to the trial counter value; and setting the synchronization status to synchronized.

In some embodiments the method further comprises if the synchronization status is set to synchronized or pre synchronized, reading the remaining bits making up the rest of the frame length.

According to another aspect, there is provided a frame header for a frame used in a communication network. The frame header comprises: a first field comprising a counter value representing the number of the frame in a sequence of frames; and a second field comprising check bits for checking the validity of the counter value, wherein the validity of the counter value is for determining a synchronization status of a receiver of the sequence of frames.

According to another aspect, there is provided a frame synchronization apparatus for providing frame synchronization. The frame synchronization apparatus comprises a processor and a memory said memory containing instructions executable by said processor, wherein said processor is operative to: a) receive a stream of bits, the stream comprising a sequence of frames, wherein each frame comprises a frame counter value representing the number of the frame in the sequence, and frame check bits for checking the validity of the frame counter value. The processor is also operative to b) decode a first section of bits, and trailing a first portion of the first section of bits as a trial counter value, and a second portion of the first section of bits as trial check bits; c) check if the trial counter value corresponds to a valid frame counter value using the trial check bits; and d) synchronize based on whether the trial counter value is determined to correspond to a valid frame counter value.

The frame synchronization apparatus may be operative to perform the method as described above.

According to another aspect, there is provided a frame synchronization apparatus for providing frame synchronization. The frame synchronization apparatus comprises a receiver for receiving a stream of bits, the stream comprising a sequence of frames, wherein each frame comprises a frame counter value representing the number of the frame in the sequence, and frame check bits for checking the validity of the frame counter value; a decoder for decoding a first section of bits, and trailing a first portion of the first section of bits as a trial counter value, and a second portion of the first section of bits as trial check bits; a counter value validity module for checking if the trial counter value corresponds to a valid frame counter value using the trial check bits; and a synchronization module for synchronizing based on whether the trial counter value is determined to correspond to a valid frame counter value.

According to another aspect, there is provided a computer program, comprising instructions which, when executed on at least one processor, cause the at least one processor to carry out a method as described above.

According to another aspect, there is provided a computer program product comprising a computer program as described above.

BRIEF DESCRIPTION OF THE DRAWINGS

For a better understanding of the present disclosure, and to show how it may be put into effect, reference will now be made, by way of example, to the accompanying drawings, in which.

DESCRIPTION

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail.

The present disclosure provides methods and apparatus for frame synchronization, for example for an agnostic optical transport for CPRI and other types of clients in a transport network for radio front-haul and/or backhaul of fixed and mobile access networks. The provided frame structure, which may also include forward error correction (FEC), allows for a fast and robust synchronization method to obtain frame synchronization in a receiver. In some examples, the examples of the present disclosure may be used for transport of frames in a radio access network. For example, the frames may be transmitted between distributed parts of a radio base station, e.g. for carrying radio data between a baseband processing unit and a remote radio unit.

Figure 1:
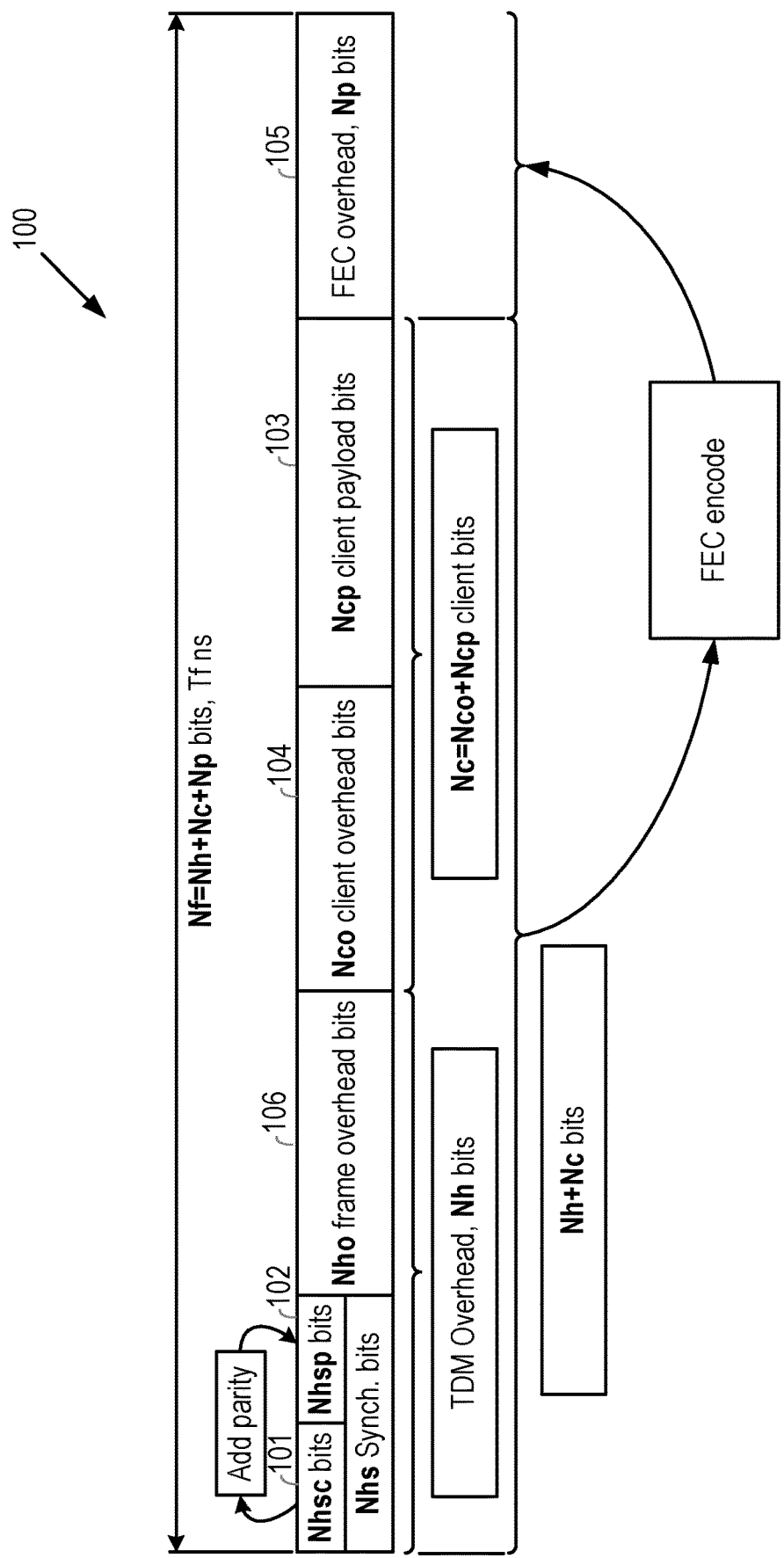
FIG. 1 illustrates an example of a frame structure used to provide synchronization according to some embodiments.

FIG. 1 illustrates an example of a frame structure used to provide synchronization. In this embodiment the frame structure is an Agnostic Transport for Fronthaul (ATF) frame structure. A frame header, i.e. represented as Nh overhead bits of the frame, for a frame 100 used in a communication network is provided. The frame header comprises a first field comprising a frame counter value representing the number of the frame in a sequence of frames. In this example the first field is the frame counter value, the Nhsc bits 101, where Nhsc is an integer value. The frame counter value may also be referred to as a multi frame counter (MFC). The frame counter value is a number which, in some embodiments, may increment by one after each frame.

The frame header may also comprise a second field comprising frame check bits for checking the validity of the frame counter value. In this example the frame check bits are Nhsp bits 102, where Nhsp is an integer value. In this example, the Nhsp bits 102 are parity bits for checking the value of the Nhsc bits 101. These may be dedicated parity bits for allowing error correction and detection within the frame counter value.

The validity of the frame counter value can then be used to determine a synchronization status of a receiver of the sequence of frames.

In this example, the frame structure is generated by taking a suitable number Ncp of client payload bits 103, where Ncp is an integer value, for a frame. Optional Nco client overhead bits 104 can be added, where Nco is an integer value. The Nco client overhead bits 104 may comprise, for example, communication channels, synchronization and/or delay information. The total number of client bits is therefore Nc=Ncp+Nco. The Nh header bits, where Nh is an integer value, may then be added to these client bits Nc. The header bits, Nh, may comprise the synchronization bits Nhs, which comprise the frame counter value bits Nhsc and the frame check bits Nhsp, and frame overhead bits Nho 106 which may be used to define the payload type and other such information.

The frame overhead bits Nho 106 may be used to transport frame and client related information. The frame counter value (MFC, Nhsc bits 101) may have up to $2^{Nhsc}$ different values. The payload type may be encoded on these bits when the frame counter value MFC/Nhsc is zero. Other values and/or bits may be used to inset status, optical supervision channels or any other useful information.

Frame synchronization may be performed by a receiver of the frame structure of FIG. 1. The frame synchronization may be performed by finding Nhs bits that have a valid frame counter value and check bit structure using a forward error correction, FEC, decoder. The FEC decoder may either find that the chosen Nhs bits are correct (i.e. code without errors), not correctable, correctable. If the chosen Nhs bits are not correct or correctable, the decoder may process a different selection of Nhs bits in a different position within the received data bit stream. If the chosen Nhs bits are correct or correctable, the value of the frame counter value can be extracted.

After a frame length (Nf bits) the FEC decoder may perform the check again. If the code is again correct or correctable, a further check may be performed to confirm synchronization by checking if the new value of frame counter value MFC/Nhsc is one more than the previous value of the frame counter value.

By performing error correction on the frame counter value the robustness of the frame locking is increased in the presence of high bit-error rates. Frame synchronization may also therefore be obtained using a short header with a frame counter value, e.g. Nhsc, and frame check bits, e.g. Nhsp.

In the embodiment of FIG. 1, the ATF frame structure is provided such that it is able to transport one CPRI client (e.g. CPRI option 10) in transparent, bit-synchronous mode. The ATF frame bitrate in this example is 27648 Mbit/s, the frame length, Nf=2400 bits, and the frame duration, Tf is 86.806 ns (11.52 MHz). The 125 µs period is exactly 1440 frames in this example. Short frame lengths, i.e. a frame duration lower than 100 ns, help keep low the latency for the transmitted CPRI clients.

Further, in FIG. 1 Np FEC bits 105 are provided for correction of the entire frame may be included in the frame header. These FEC overhead bits may be Np=120 bits, or 5% of the total frame length.

In some examples the synchronization bits may amount to 16 bits, e.g. 8 bits for the frame counter value (Nhsc bits), and 8 bits for the check bits (Nhsp bits). In this example, two Hamming [8,4] codes can be used, with the ability to correct two bit errors and detect up to 4 bit errors.

The frame overhead bits Nho may amount to 16 bits. The first byte of the first frame may contain the payload type. The total bitrate of the overhead may be 184.32 Mb/s (i.e. 27648*16/2400). As the bitrate is directly related to a multiple of the basic CPRI rate (3.84 Mb/s) this allows for simple, transparent bit-synchronous mapping of CPRI frames. It is also therefore possible to provide transparent, asynchronous mapping of Ethernet or other types of clients.

Figure 2:
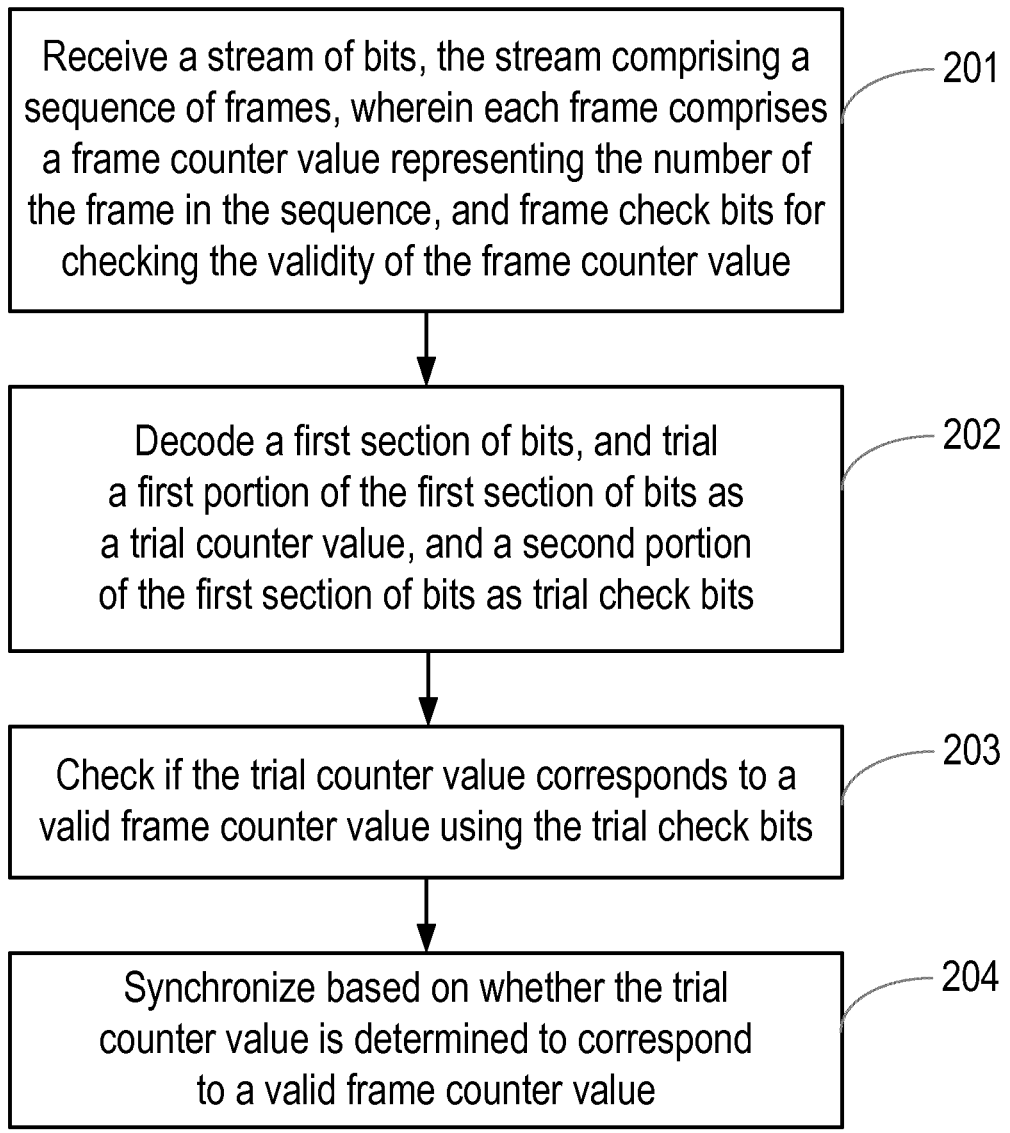
FIG. 2 illustrates a method of frame synchronization according to some embodiments.

FIG. 2 illustrates a method of frame synchronization according to some embodiments. In some embodiments, the method may be performed by a frame synchronization apparatus (for example as described later with reference to FIGS. 5, 6 and 7). In step 201, the method comprises, receiving a stream of bits, the stream comprising a sequence of frames, wherein each frame comprises a frame counter value representing the number of the frame in the sequence, and frame check bits for checking the validity of the frame counter value. In some embodiments the frames may comprise a frame structure such as the Agnostic Transport for Fronthaul (ATF) frame structure as described in FIG. 1. The number of the frame may be considered as a position of the frame in a sequence of frames.

The stream of frames therefore each comprises a frame counter value (e.g. Nhsc bits) and frame check bits (e.g. Nhsp bits) for the frame counter value. However, as of yet, the frame synchronization apparatus is unaware of where the frames are delineated in the stream of bits.

In step 202 the method comprises decoding a first section of bits, and trailing a first portion of the first section of bits as a trial counter value, and a second portion of the first section of bits as trial check bits. The method is therefore trailing two portions of the section of bits as a trial counter value and trial check bits, in order to check whether these bits correspond to a frame counter value and frame check bits.

In some embodiments the first section of bits is 16 bits long with the first portion being the first 8 bits, and the second portion being the second 8 bits.

In step 203 the method comprises checking if the trial counter value corresponds to a valid frame counter value using the trial check bits. In some embodiments, therefore, the frame synchronization apparatus checks the value of the trial counter value using the value of the trial check bits. In some embodiments, the trial counter value corresponds to a valid frame counter value if the trial counter value is correct or is correctable using the trial check bits.

In an example where the first section of bits is 16 bits long with the first portion being the first 8 bits and the second portion being the second 8 bits, the trial counter value is considered correctable if no more than two bits of the trial counter value are incorrect.

In step 204, the method comprises synchronizing based on whether the trial counter value is determined to correspond to a valid frame counter value. In some embodiments the synchronizing based on whether the trial counter value corresponds to a valid frame counter value comprises determining a synchronization status, wherein the synchronization status is either: synchronized, unsynchronized or pre synchronized. In this example the pre synchronized status is a status which allows the synchronization status to be changed to synchronized.

The method therefore determines whether or not the first portion of bits corresponds to a valid frame counter value, in other words, whether the first section of bits corresponds to part of a frame containing a frame counter value and frame check bits. If the first portion of bits corresponds to a valid frame counter value, the frame synchronization block can then determine where in the stream of bits the delineations between frames lie, and synchronize with the frames.

In some embodiments the delineations between frames may be indicated by a pulse signal which may be output by a frame synchronization apparatus performing the above method.

Thus, the bits of the frame counter value are associated with check bits. The check bits provide for detection and correction of errors in the bits of the frame counter value. A synchronization status is based on whether the frame counter value is determined to be valid, either due to the original bits being determined to be correct or corrected using the check bits. The forward error correction provided by the check bits allows for finding the bits of the frame counter value, e.g. when synchronization has been lost or is not accurate. The check bits provide a positive determination that the section of bits being used for the frame counter value is the correct section of bits in the frame.

Figure 3A:
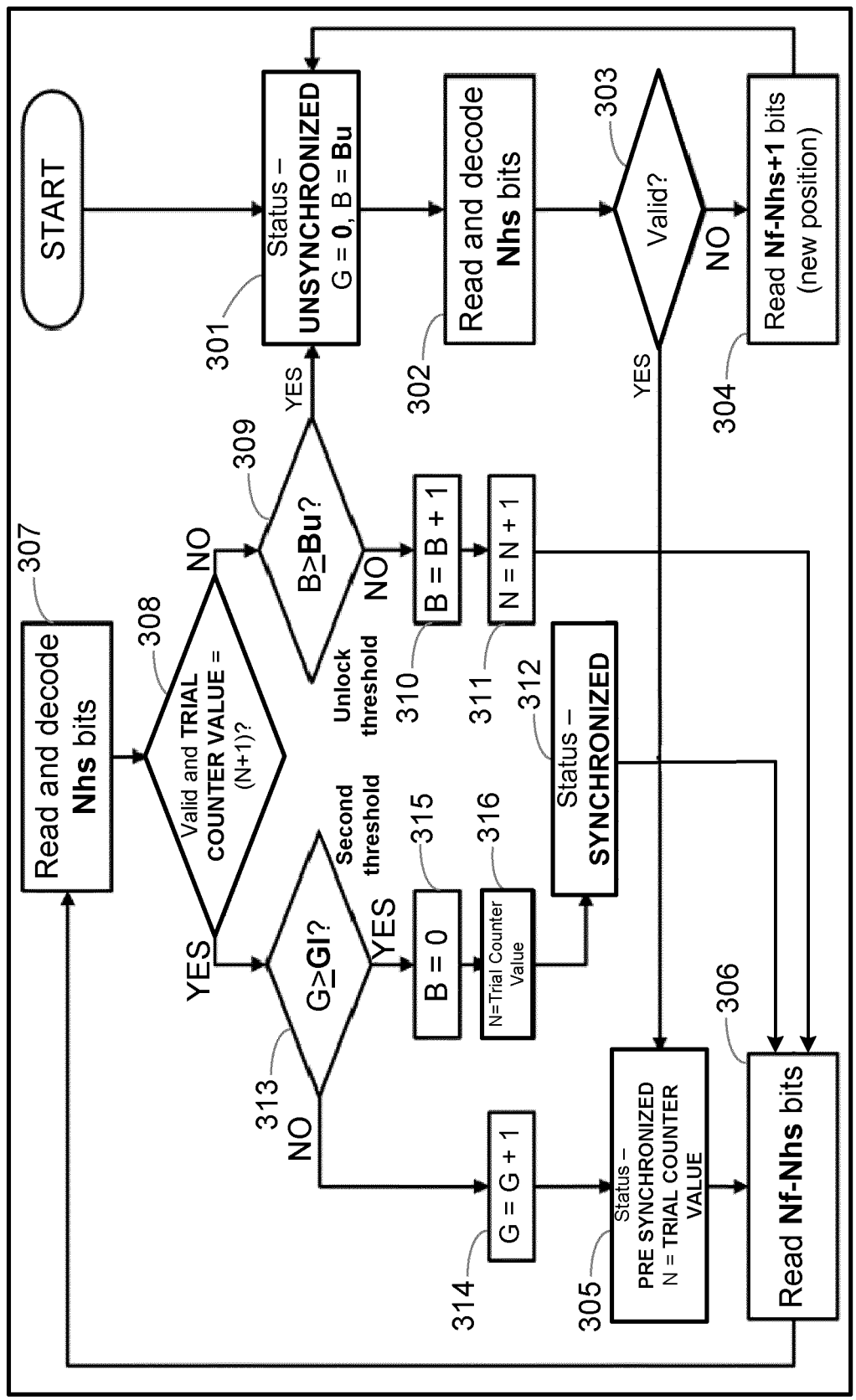
FIG. 3a illustrates an example of the method of FIG. 2 in more detail.

FIG. 3a illustrates in more detail the steps 202 to 204 of the method of FIG. 2. In some embodiments the method of FIG. 3a is performed by a frame synchronization apparatus. The frame synchronization apparatus may be a part of a node in a radio access network. Transmission of the frames may use optical, electronic, radio, microwave or any other form of communication.

In step 301, the method starts with a synchronized status of unsynchronized. A count of good frames, G, for counting the number of consecutive valid frames received may be set to zero. A count of invalid frames, B, for counting the number of consecutive invalid frames received, may be set to a threshold value of $B_u$.

In step 302, the method comprises reading and decoding a first section of bits comprising Nhs bits, where Nhs is an integer value, trailing a first portion of the first section of bits as a trial counter value, and a second portion of the first section of bits as trial check bits. In other words, this Nhs bits are separated into a trial counter value, comprising Nhsc bits, and trial check bits, comprising Nhsp bits. The trial counter value may potentially correspond to a valid frame counter value if, for example, the first portion of bits comprises the same bits as the frame counter value for a frame.

In step 303 the method comprises determining if the trial counter value corresponds to a valid frame counter value. In some embodiments, the trial counter value corresponds to a valid frame counter value if the trial counter value is correct or is correctable using the trial check bits. In an example where Nhs is equal to 16 bits with the first portion being the first 8 bits and the second portion being the second 8 bits, the trial counter value is considered correctable if the trial check bits are sufficient to provide for forward error correcting of the trial counter value. For example, the trial counter value is considered correctable if no more than two bits of the trial counter value are incorrect.

If the trial counter value does not correspond to a valid frame counter value and the synchronization status is unsynchronized, which it would be at the start of the process, the method passes to step 304.

In step 304 the method comprises decoding a second section of bits of the stream of bits, wherein the second section of bits is different from the first section of bits. In some embodiments, the second section of bits is shifted by a frame length plus one bit along the stream of bits with respect to the first section of bits. By doing this the method can assume for the trial counter value a slightly different position along the stream of bits, in order to determine if this new position will lead to synchronization.

Steps 301 to 304 may be repeated for different sections of bits, each shifted by a frame length plus (or minus) one or more bits from the previous section of bits, until the trial counter value for a particular section of bits is found in step 303 to correspond to a valid frame counter value.

If in step 303 a trial counter value is found to correspond to a valid frame counter value, the method passes to step 305. In step 305 the method comprises setting the synchronization status to pre synchronized and setting a previous counter value, N, to the trial counter value. The pre synchronized status is a status which allows the synchronized status to be changed to synchronized. In some embodiments, a previous counter value, N, is set to equal the trial counter value for the particular section of bits.

In step 306 the method comprises reading the remaining bits making up the rest of the frame length. For example, reading the client payload bits Ncp of the frame, and the other overhead bits of the frame, such as the client overhead bits Nco, and frame overhead bits Nho, and any FEC overhead Np bits.

In step 307 the method comprises reading a third section of Nhs bits shifted a frame length, Nf, along the stream of bits with respect to the particular section of bits for which the trial counter value was found to correspond to a valid frame counter value. In other words, as the method has found a particular set of bits to contain a valid frame counter value, the method will therefore look a frame length away from the particular section of bits, to check if the trial counter value for what should be the next frame value is also valid. Similarly to as in step 302, a first portion of the third section of bits is set as a trial counter value and a second portion of the third section of bits is set as trial check bits.

In step 308 the method comprises performing step 303 for the third section of bits. In other words, the method of step 308 comprises checking if the trial counter value corresponds to a valid frame counter value. Again, the trial counter value may be considered to correspond to a valid frame counter value if the trial counter value is correct, or if the trial counter value is correctable using the trial check bits. Step 308 also may comprise checking if the trial counter value for the third section is next in sequence to the previous counter value, N. As explained in step 305, the previous counter value N is set to the value of the trial counter value when the synchronization status changes to pre synchronized. Therefore, for the third section of bits, which is a frame length along from the particular set of bits which was found to correspond to a valid frame counter value, the trial counter value should theoretically be one more than the previous counter value, if it is determined to be valid.

It will be appreciated, that the actual value of the frame counter value in the frames may form any type of sequence, and may therefore not necessarily increment by one for each frame.

If, in step 308, the trial counter value counter value does not correspond to a valid frame counter value or the trial counter value is not next in sequence to the previous counter value, the method passes to step 309. In step 309, the method comprises determining if a count of invalid frames, B, is more than or equal to a first threshold number, $B_u$.

If at this step the method is passing through a first loop after the synchronization status has moved from unsynchronized to pre synchronized, then the count of invalid frames in some embodiments will have just been set to $B_u$ when the status was set to unsynchronized, in which case, the count of bad frames at this stage would be equal to the first threshold number $B_u$.

If, on the other hand, the synchronization status was previously synchronized, i.e. the method is not passing through a first loop after the synchronization status has moved from unsynchronized to pre synchronized, then the count of invalid frames may have been set to zero in a previous loop, as will be described later, and therefore the count of invalid frames at step 309 may or may not be more than or equal to the first threshold number $B_u$.

If at step 309 the count of invalid frames, B, is more than or equal to the first threshold number, the method passes back to step 301 and the status is set to unsynchronized, and the count of good frames G set to zero, and the count of consecutive invalid frames received, i.e. B, set to the first threshold $B_u$.

If, at step 309 the count of invalid frames, B, is not equal to or more than the first threshold number, $B_u$, the method passes to step 310 in which the count of invalid frames B is increased by one. The method may also then pass to step 311 in which the previous counter value N, is incremented by one.

The synchronisation status may then be maintained, as either synchronized or pre synchronised, i.e. in view of the existing status being either synchronised or pre synchronised.

Again, the method may then pass to step 306 to check a different set of bits shifted a frame length along the stream of bits.

Returning to step 308, if the trial counter value corresponds to a valid frame counter value and the trial counter value is next in sequence to the previous counter value, N, the method passes to step 313. In step 313 the method comprises comparing a count of good frames, G, to a second threshold value $G_l$.

If the count of good frames, G, is not equal to or more than the second threshold value $G_l$, then the method passes to step 314 in which the count of good frames G is increased by one, i.e. G=G+1.

The method then passes to step 305, in which the synchronization status is maintained as pre synchronized. The previous counter value, N, is set to the trial counter value.

As described in relation to step 301, when the status is set to unsynchronized, then the count of good frames is set to zero. The method must therefore pass through $G_l$ iterations of finding valid frame counter values before the count of good frames will pass over the $G_l$ threshold. The method may then pass back to step 306 to check a different set of bits shifted a frame along the stream of bits.

If at step 313 the count of good frames G is more than or equal to the second threshold value GI, the method passes to step 315 in which the count of invalid frames, B, may be set to zero. This resets the number of invalid frames so that $B_u$ iterations of bad frames must be found before synchronization is lost.

The method may then pass to step 316 in which the previous counter value, N, is set to the trial counter value, and step 312 in which the synchronization status is set to synchronized.

Again, the method may then pass to step 306 to check a different set of bits shifted a frame along the stream of bits.

In general therefore, a frame synchronization apparatus performing the method of FIG. 3a may decode Nhs bits from a stream of bits and sends out a trial counter value and a decoding result of whether or not the trial counter value corresponds to a valid frame counter value. The result may then be used to change the synchronization status of the frame synchronization apparatus.

Figure 3B:
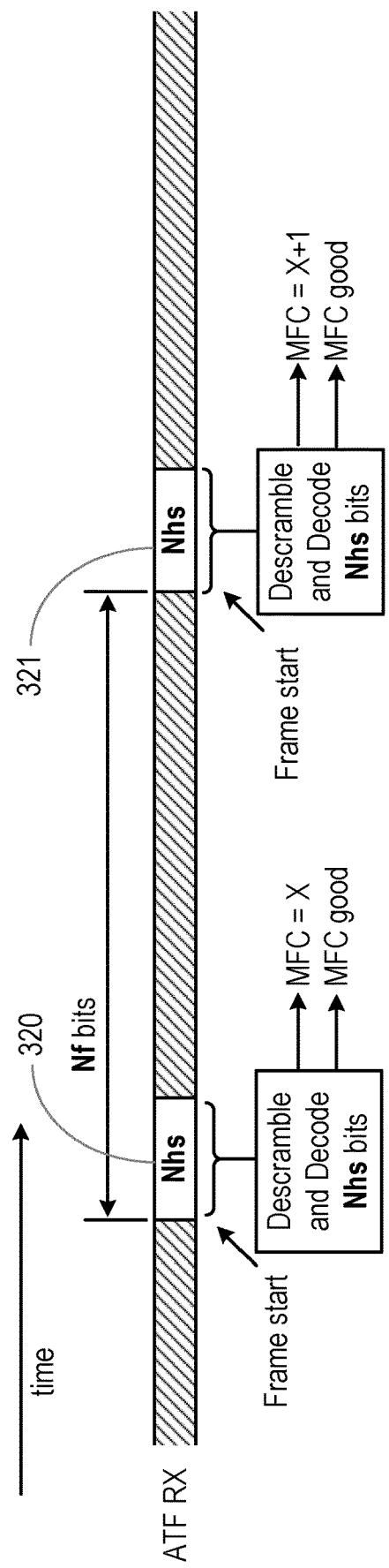
FIG. 3b shows an example of a method according to another embodiment.

FIG. 3b illustrates a more high-level example of decoding counter values when the Nhs bits being decoded are in the correct position within the frame. The first section of Nhs bits 320 is descrambled and decoded and a valid frame counter value, X, is found. The method therefore looks a frame length, Nf bits, along the frame to a second section of Nhs bits 321. As the frame start point has been found correctly, these are descrambled and decoded to find another valid frame counter value of X+1.

A previous counter value, N, keeps track of the value of the relevant frame counter value that the apparatus is trying the find. Any sum operations may be performed in modulo logic.

The count of good frames, G, may be used to count the number of good frames received. The second threshold $G_l$ is the number of valid frame counter values required in order to obtain a synchronization status of synchronized. Therefore, if the procedure of FIG. 3b is reiterated such that this second threshold $G_l$ of valid frame counter values is reached, a synchronized status is achieved.

During the synchronized or pre synchronized synchronization status', any uncorrectable trial counter values, or out of sequence trial counter values may be discarded and considered invalid. The count of invalid frames, B, keeps track of the consecutive invalid frame counter values received (uncorrectable or out of sequence). If the first threshold, $B_u$, for the count of invalid frames is reached the synchronization is lost, and the synchronization status may be set to unsynchronized.

Figure 4:
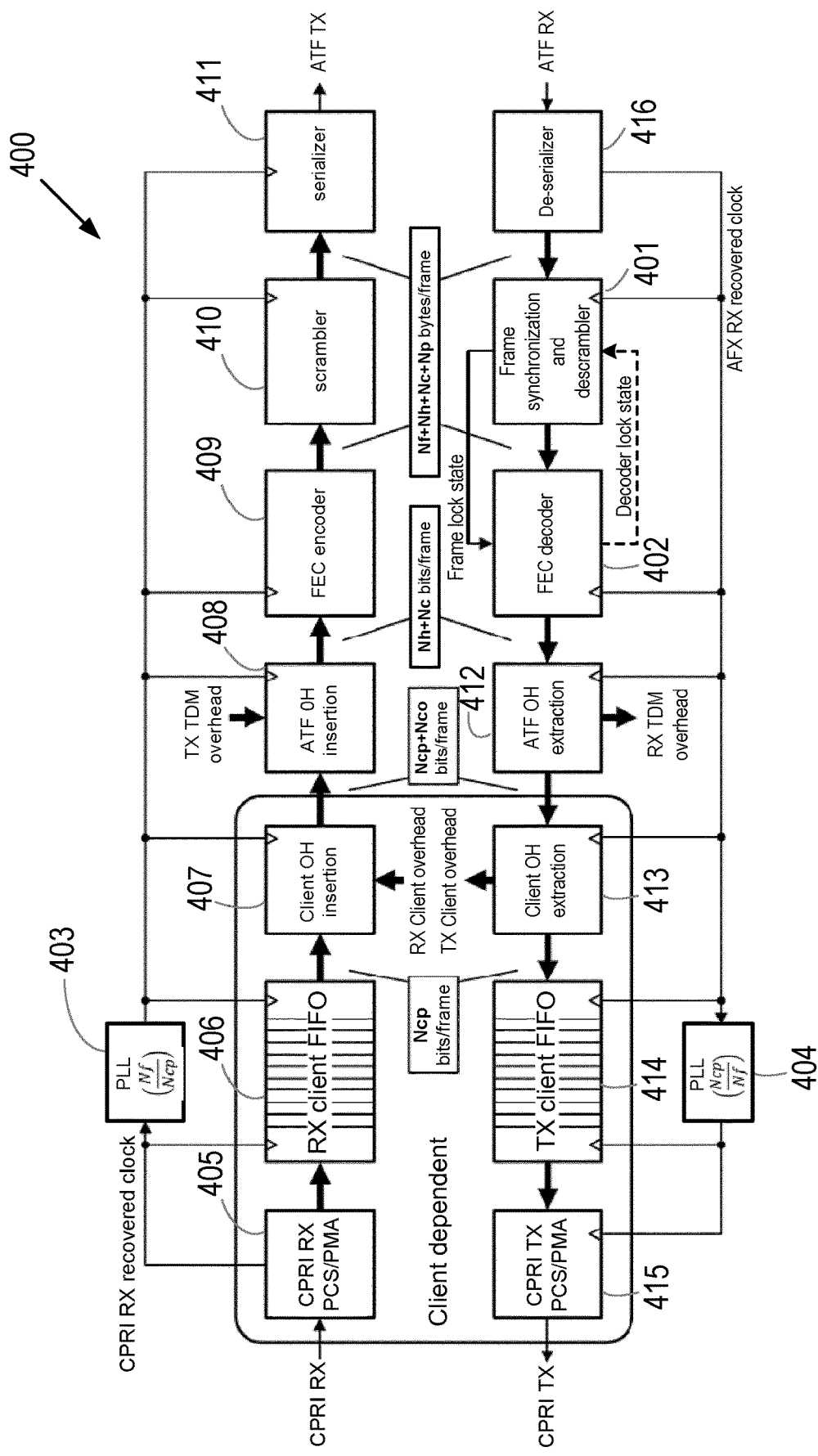
FIG. 4 illustrates a block diagram of a framer for transmitting and receiving frames according to some embodiments.

FIG. 4 illustrates a block diagram of a framer 400 for transmitting and receiving frames according to some embodiments. A frame synchronization and descrambler block 401, for example performing a method as described above, can interact with a FEC decoder 402 for the whole frame. The decoder result can be used to enhance the robustness of the synchronization.

Phase locked loops (PLL) 403 and 404, may be used to regenerate frequencies from the client side and frame side (and vice-versa), for example using simple ratios.

On the transmitting side of the framer 400, the framer 400 comprises a receiver 405 for receiving CPRI payload data from clients. The CPRI data is forwarded to a client first in first out (FIFO) buffer 406 which outputs the payload data with Ncp bits per frame. The client overhead data bits Nco are then inserted at the client overhead inserter 407 such that the frames now comprise Ncp+Nco=Nc bits/frame. The transmitter overhead data bits Nh may then be inserted into the frames by the transmitting overhead inserter 408. These transmitter overhead data bits may comprise the synchronization bits Nhs comprising the frame counter value and the frame check bits, plus any other frame overhead bits, e.g. frame overhead bits Nho of FIG. 1. The transmitting overhead inserter 408 then forwards the Nh+Nc bits per frame (plus any other bits such as Nho) to a forward error corrector encoder 409 where extra FEC overhead bits, Np are added to each frame. The total frame length is then Nh+Nc+Np (where Nh=Nhs+Nho, and Nc=Nco+Ncp). These frames are then scrambled by a scrambler 410 and transmitted by a serializer 411. The frames may be scrambled with a synchronous scrambler 410. The scrambler pattern may be fixed on each frame, so it can be performed on the whole frame and will not therefore prevent any parallel frame recognition process.

On the receiving side of the framer 400, a de-serializer 416 receives a stream of bits and forwards the stream to a frame synchronizer and descrambler 401. An example of the frame synchronizer and descrambler 401 is shown in more detail in FIG. 5. The frame synchronizer and descrambler 401 may output a synchronization status of synchronized, pre synchronized or unsynchronized, to an FEC decoder 402. The frame synchronizer and descrambler 401 may perform a method as described with reference to FIGS. 2 and 3 above.

The FEC decoder 402 will determine whether the entire frame is valid in terms of whether or not it can be corrected, and may correct the frame if it is correctable. The FEC decoder 402 may then output the corrected frames to a receiving overhead extractor 412. The Forward Error Correction (FEC) on the whole frame enables reliable transmission of information and can be used to further increase the robustness of the frame synchronization described earlier.

The receiving overhead extractor 412 may extract the received overhead bits Nh. The remaining bits may then be forwarded to the client overhead extractor 413, which may extract the client overhead bits Nco and transmit the remaining payload bits to the client FIFO buffer 414 in order to transmit the payload bits, via a transmitter 415 to the client, for example as a CPRI transmission.

In some embodiments the frame synchronizer and descrambler 401 utilises feedback information from the FEC decoded 402.

Figure 5:
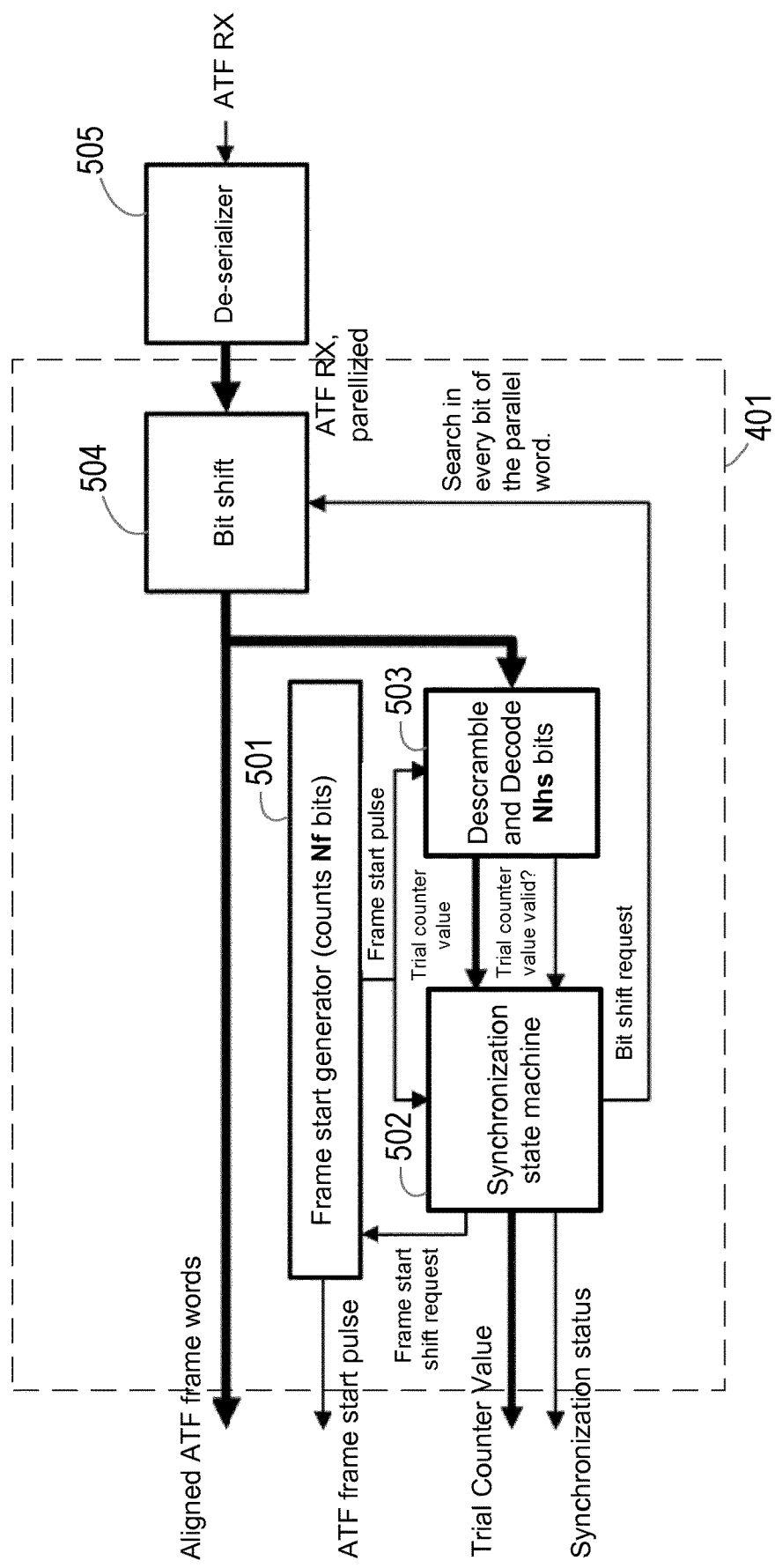
FIG. 5 illustrates a frame synchronization and descrambler according to some embodiments.

FIG. 5 illustrates an example of a frame synchronization and descrambler 401. The frame synchronizer and descrambler may be the frame synchronizer and descrambler of FIG. 4. The frame synchronization and descrambler 401 receives a stream of de-serialized bits from de-serializer 505. The stream of bits may comprise frames wherein the frames have an ATF structure as described with reference to FIG. 1.

A frame start generator 501 may count a stream of bits, e.g. a number of bits corresponding to a number of bits Nf forming a frame, and will trigger when a synchronization state machine 502 will start decoding a first section of Nhs bits. The synchronization state machine 502 and descrambler and decoder 503 may descramble the stream of bits and perform a method as described in reference to FIGS. 2 and 3. If the decoded Nhs bits result in an unsynchronized status, the synchronization state machine 502 will send a frame start shift request to the frame start generator 501 in order to shift the position in which the Nhs decoded bits fall.

The de-serializer 505 may comprise clock and data recovery and parallelization of the incoming serial stream of bits. A SIPO (serial in parallel out) extracts a number of bits, for example with a slow clock locked to the incoming data rate. For example an input bitrate of 27648 Mbit/s, parallelization to 80 bit with the recovered clock of 1/80 of the incoming data rate (345.6 MHz). The parallelized received data may not be aligned to the frame start, therefore the bit shift 504 may use a subset of the two last received words (barrel shifter) to find the start of the frame.

Since the frame duration may be several clock cycles (30 clock cycles in the example) it is possible to check for valid counter values at every clock cycle, and have different state machines in parallel with only one decoder. For example, there may be 80 bit words, 30 searched in parallel with 80 different possible bit shift values.

In some examples, a simple error detection and correction for this header allows multiple synchronization state machines to search for the frame start in parallel in several positions to speed-up the synchronization or frame lock time. There may therefore be multiple synchronization state machines working in parallel checking different positions within the bits stream, in order to locate a valid frame counter value.

The stream of bits is output from the frame synchronization and descrambler 401 to a FEC decoder 402 of FIG. 4, along with the trial counter value, synchronization status, and frame start pulse which gives an indication of the synchronized start for each frame.

The embodiments described above provide for the use of the synchronization bits Nhs, which allow for a short frame length choice and therefore minimize the latency introduced by the framer, which is beneficial for CPRI clients.

The frame bitrate allows simple bit-synchronous mapping with clock recovery.

The clients can be mapped transparently, with deterministic latency. For example, CPRI option 10 bitrate is 24330.24 Mb/s. The ratio of the frame, for example the ATF frame of FIG. 1, is 25/22, which is easily attainable with PLLs. In this example, the client payload bits are exactly Ncp=2112, corresponding to 32×66 bit words. In this example there are Nco=136 client overhead bits (17 bytes per frame). Therefore the total bitrate of the overhead 27648*136/2400=1566.72 Mb/s.

For another example, the 25G Ethernet bitrate is 25781.25 Mb/s. The client payload bits are 2237.96. Therefore by having Ncp=2240 plus Nco=8 the frame allows for asynchronous mapping plus payload stuffing information.

The last payload byte may be used for stuff data, for example for rate adaptation. In this example, one byte of the payload overhead is used to signal the stuff data.

Figure 6:
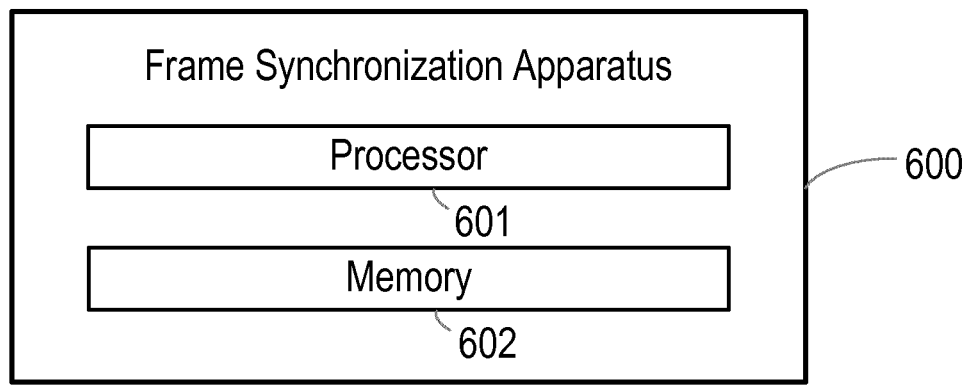
FIG. 6 illustrates an example of a frame synchronization apparatus for providing frame synchronization according to some embodiments.

FIG. 6 illustrates a frame synchronization apparatus 600 for providing frame synchronization. The frame synchronization apparatus 600 may be a frame synchronization and descrambler block 401 as described in FIGS. 4 and 5. In this embodiment the frame synchronization apparatus 600 comprises a processor 601 and a memory 602 said memory 602 containing instructions, e.g. as a computer program, executable by said processor 601. The apparatus 600 is operative to receive a stream of bits, the stream comprising a sequence of frames, wherein each frame comprises a frame counter value representing the number of the frame in the sequence, and frame check bits for checking the validity of the frame counter value. The apparatus 600, using the processor 601, is operative to decode a first section of bits, and trial a first portion of the first section of bits as a trial counter value, and a second portion of the first section of bits as trial check bits. The apparatus 600 is operative to check if the trial counter value corresponds to a valid frame counter value using the trial check bits, and synchronize based on whether the trial counter value is determined to correspond to a valid frame counter value.

The processor 601 is configured to carry out any example described, in association with the memory 602. In some aspects, the processor 601 is arranged to execute a computer program, which executes or controls a method described. The processor 601 may be considered as processing circuitry. Processing circuitry is provided using any combination of one or more of a suitable central processing unit (CPU), multiprocessor, microcontroller, digital signal processor (DSP), etc., capable of executing software instructions stored in a computer program product e.g. in the form of a storage medium. The processing circuitry 601 may be provided as an application specific integrated circuit (ASIC), or field programmable gate array (FPGA). The memory 602 may comprise persistent storage, which, for example, can be any single one or combination of magnetic memory, optical memory, solid state memory or even remotely mounted memory.

The frame synchronization apparatus 600 may be operative to perform a method as described with relation to any example or any of the above figures.

Aspects of the disclosure may provide a computer program, comprising instructions which, when executed on at least one processor (e.g. processor 601), cause the at least one processor to carry out a method according to any example. Aspects of the disclosure may provide a computer program product comprising a computer program, as specified above. The computer program product, or a carrier for the computer program product, may include an electrical signal, an optical signal, a radio signal, a magnetic tape or disk, an optical disk or a memory stick.

Figure 7:
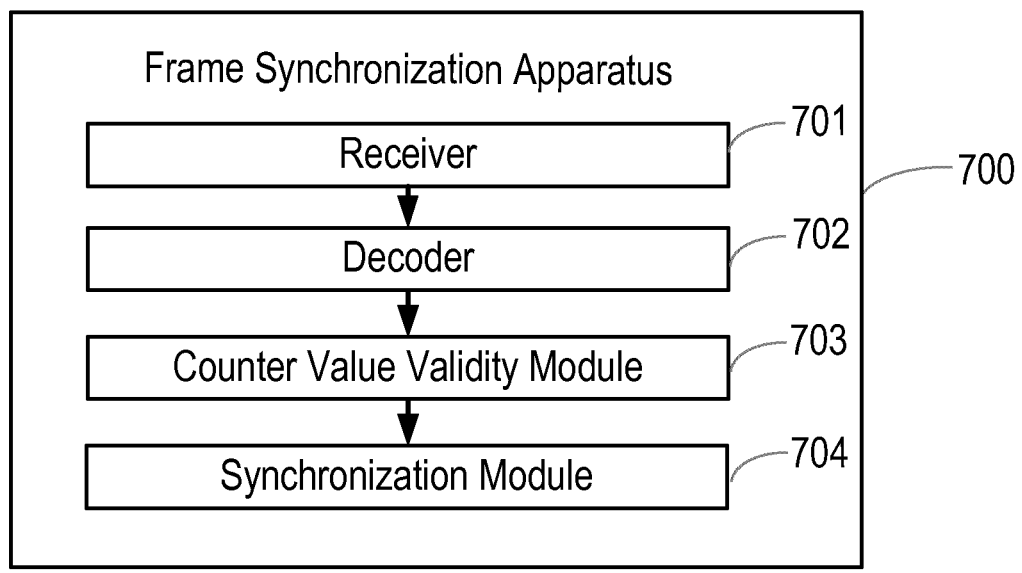
FIG. 7 illustrates an example of a frame synchronization apparatus for providing frame synchronization according to some embodiments.

FIG. 7 illustrates a frame synchronization apparatus 700 for providing frame synchronization. The frame synchronization apparatus 700 may be a frame synchronization and descrambler block 401 as described in FIGS. 4 and 5. The frame synchronization apparatus comprises a receiver 701 for receiving a stream of bits, the stream comprising a sequence of frames, wherein each frame comprises a frame counter value representing the number of the frame in the sequence, and frame check bits for checking the validity of the frame counter value. The frame synchronization apparatus 700 also comprises a decoder 702 for decoding a first section of bits, and trailing a first portion of the first section of bits as a trial counter value, and a second portion of the first section of bits as trial check bits. The frame synchronization apparatus may further comprise a counter value validity module 703 for checking if the trial counter value corresponds to a valid frame counter value using the check bits. The frame synchronization apparatus may further comprise a synchronization module 704 for synchronizing based on whether the trial counter value is determined to correspond to a valid frame counter value. The frame synchronization apparatus 700 may be implemented using a processor and memory.

There is therefore provided a frame structure, and apparatus and method for synchronization of such a frame structure. The proposed apparatus and method require no frame alignment patterns or coding overhead. Furthermore, the method allows for a parallel search of the frame start, which can speed up the time required for synchronization. The frame check bits for error correcting of the frame counter value allow for reliable frame synchronization even with high input bit-error rates. Aspects of the disclosure provide for transmission and receiving of data signals in frames between nodes, e.g. in a radio access network. The option of having Forward Error Correction on the whole frame further increases the robustness of the synchronization process. An example of the disclosure provides for a transmitter, or a method of transmitting, for frames having both a frame counter value and check bits for checking that the decoded bits are bits of the frame counter value and/or for determining the bits of the frame counter value are correct and/or correctable.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of frame synchronization, the method comprising:
   a) receiving a stream of bits, the stream comprising a sequence of frames, wherein each frame comprises a frame counter value representing the number of the frame in the sequence, and frame check bits for checking the validity of the frame counter value;
   b) decoding a first section of bits, and trialing a first portion of the first section of bits as a trial counter value, and a second portion of the first section of bits as trial check bits;
   c) checking if the trial counter value corresponds to a valid frame counter value using the trial check bits; and
   d) synchronizing based on whether the trial counter value is determined to correspond to a valid frame counter value.

2. The method of claim 1, wherein the trial counter value corresponds to a valid frame counter value if the trial counter value is correct or is correctable using the trial check bits.

3. The method of claim 1:
   wherein the synchronizing comprises determining a synchronization status;
   wherein the synchronization status is either: synchronized, unsynchronized, or pre-synchronized;
   wherein the pre-synchronized status is a status which allows the synchronization status to be changed to synchronized.

4. The method of claim 3, further comprising resetting, if the trial counter value does not correspond to a valid frame counter value and the synchronization status is currently unsynchronized, the synchronization status to unsynchronized.

5. The method of claim 4, further comprising, if the synchronization status is set to unsynchronized:
   decoding a second section of bits of the stream of bits, wherein the second section of bits is different from the first section of bits; and
   performing steps b), c), and d) for the second section of bits in place of the first section of bits.

6. The method of claim 5, wherein the second section of bits is shifted by a frame length plus one bit along the stream of bits with respect to the first section of bits.

7. The method of claim 6, further comprising, repeating steps b), c), and d) for different sections of bits, each shifted by a frame length plus one bit from the previous section of bits, until the trial counter value for a particular section of bits is found to correspond to a valid frame counter value.

8. The method of claim 3, further comprising, if the trial counter value corresponds to a valid frame counter value and the current synchronization status is unsynchronized:
   setting the synchronization status to pre-synchronized; and
   setting a previous counter value to the trial counter value.

9. The method of claim 8, wherein the method further comprises reading, if the synchronization status is set to pre-synchronized or synchronized, a third section of bits shifted a frame length along the stream of bits with respect to the particular section bits for which the trial counter value was found to correspond to a valid frame counter value.

10. The method of claim 9, wherein the method further comprises, if the synchronization status is set to pre-synchronized or synchronized:

performing steps b) and c) for the third section of bits; and
checking if the trial counter value for the third section is next in sequence to the previous counter value.

11. The method of claim 10, wherein the method further comprises setting the synchronization status to unsynchronized if:
   the synchronization status is set to pre-synchronized or synchronized;
   the trial counter value does not correspond to a valid frame counter value or the trial counter value is not next in sequence to the previous counter value; and
   a count of invalid frames is more than a first threshold number.

12. The method of claim 10, the method further comprises, if 1) the synchronization status is set to synchronized, 2) the trial counter value does not correspond to a valid frame counter value or the trial counter value is not next in sequence to the previous counter value, and 3) a count of invalid frames is not more than a first threshold number:
   increasing the count of invalid frames by one; and
   maintaining the synchronization status as synchronized.

13. The method of claim 10, wherein the method further comprises incrementing the previous counter value by one if:
   the synchronization status is set to synchronized;
   the trial counter value does not correspond to a valid frame counter value or the trial counter value is not next in sequence to the previous counter value; and
   a count of invalid frames is not more than a first threshold number.

14. The method of claim 10, wherein the method further comprises, if 1) the synchronization status is set to pre synchronized, 2) the trial counter value corresponds to a valid frame counter value and the trial counter value is next in sequence to the previous counter value, and 3) a count of good frames is not more than a second threshold number:
   increasing the count of good frames by one;
   setting the previous count value as the trial count value; and
   maintaining the synchronization status as pre-synchronized.

15. The method of claim 10, wherein the method further comprises, if 1) the synchronization status is set to pre-synchronized or synchronized, 2) the trial counter value corresponds to a valid frame counter value and the trial counter value is next in sequence to the previous counter value, and 3) a count of good frames is more than a second threshold number:
   setting the count of invalid frames to zero;
   setting the previous counter value to the trial counter value; and
   setting the synchronization status to synchronized.

16. The method of claim 3, further comprising reading, if the synchronization status is set to synchronized or pre-synchronized, the remaining bits making up the rest of the frame length.

17. A frame synchronization apparatus for providing frame synchronization, the frame synchronization apparatus comprising:
   processing circuitry;
   memory containing instructions executable by the processing circuitry whereby the frame synchronization apparatus is operative to:
   a) receive a stream of bits, the stream comprising a sequence of frames, wherein each frame comprises a frame counter value representing the number of the frame in the sequence, and frame check bits for checking the validity of the frame counter value;
   b) decode a first section of bits, and trial a first portion of the first section of bits as a trial counter value, and a second portion of the first section of bits as trial check bits;
   c) check if the trial counter value corresponds to a valid frame counter value using the trial check bits; and
   d) synchronize based on whether the trial counter value is determined to correspond to a valid frame counter value.

18. The frame synchronization apparatus of claim 17, wherein the trial counter value corresponds to a valid frame counter value if the trial counter value is correct or is correctable using the trial check bits.

19. The frame synchronization apparatus of claim 17:
   wherein the instructions are such that the frame synchronization apparatus is operative to synchronize by at least determining a synchronization status;
   wherein the synchronization status is either: synchronized, unsynchronized, or pre-synchronized; and
   wherein the pre-synchronized status is a status which allows the synchronization status to be changed to synchronized.

20. A non-transitory computer readable recording medium storing a computer program product for frame synchronization, the computer program product comprising software instructions which, when run on processing circuitry of a frame synchronization apparatus, causes the frame synchronization apparatus to:
   a) receive a stream of bits, the stream comprising a sequence of frames, wherein each frame comprises a frame counter value representing the number of the frame in the sequence, and frame check bits for checking the validity of the frame counter value;
   b) decode a first section of bits, and trial a first portion of the first section of bits as a trial counter value, and a second portion of the first section of bits as trial check bits;
   c) check if the trial counter value corresponds to a valid frame counter value using the trial check bits; and
   d) synchronize based on whether the trial counter value is determined to correspond to a valid frame counter value.

* * * * *